United States Patent [19]

Sagoi et al.

[11] Patent Number: 4,748,073
[45] Date of Patent: May 31, 1988

[54] PERPENDICULAR MAGNETIC RECORDING MEDIUM WITH MULTILAYERED PROTECTIVE LAYER

[75] Inventors: Masayuki Sagoi; Yoichiro Tanaka, both of Yokohama, Japan

[73] Assignee: Kabushiki Kaisha Toshiba, Kawasaki, Japan

[21] Appl. No.: 878,795

[22] Filed: Jun. 26, 1986

[30] Foreign Application Priority Data

Jun. 29, 1985 [JP] Japan .................................. 60-143702

[51] Int. Cl.$^4$ .............................................. G11B 5/72
[52] U.S. Cl. .................................... 428/213; 427/128; 427/131; 427/132; 428/216; 428/217; 428/335; 428/336; 428/446; 428/450; 428/694; 428/695; 428/704; 428/900
[58] Field of Search ....................... 427/131, 132, 128; 428/695, 693, 692, 328, 329, 331, 450, 704, 900, 213, 217, 216, 335, 336, 446; 360/134-136

[56] References Cited

U.S. PATENT DOCUMENTS

| | | | |
|---|---|---|---|
| 4,124,736 | 11/1978 | Patel | 427/132 |
| 4,162,350 | 7/1979 | Yanagisawa | 427/132 |
| 4,187,344 | 2/1980 | Fredriksson | 428/331 |
| 4,307,156 | 12/1981 | Yanagisawa | 427/132 |
| 4,390,562 | 6/1983 | Yanagisawa | 427/132 |
| 4,411,963 | 10/1983 | Aine | 428/900 |
| 4,419,381 | 12/1983 | Yamazaki | 427/132 |
| 4,503,125 | 3/1985 | Nelson | 428/900 |
| 4,701,374 | 10/1987 | Sagoi | 428/695 |

FOREIGN PATENT DOCUMENTS

| | | | |
|---|---|---|---|
| 0077932 | 6/1981 | Japan | 428/900 |
| 176537 | 10/1982 | Japan . | |
| 133629 | 8/1983 | Japan . | |
| 0177528 | 10/1983 | Japan | 428/329 |
| 0222439 | 12/1983 | Japan | 428/329 |
| 0258727 | 12/1985 | Japan | 428/328 |

OTHER PUBLICATIONS

Digest, 4th Ann. Conf. on Mag., Japan, p. 132, T. Nishimura et al., NTT, Nov. 1980.

Primary Examiner—Ellis P. Robinson
Attorney, Agent, or Firm—Oblon, Fisher, Spivak, McClelland & Maier

[57] ABSTRACT

A perpendicular magnetic floppy disk has a base layer on each side of which a recording layer is formed having an axis of easy magnetization in a direction perpendicular to its surface. A multilayered protective layer structure is provided on the recording layer. The protective layer structure includes double-stacked nonmagnetic thin-film layer structures made of an Si-N-O-based film and silicon oxide film, respectively. The total thickness of the multilayered protective layer structure is smaller than 40 nanometers, which is thin enough to maximize an efficiency in perpendicular magnetic recording of data signal.

8 Claims, 1 Drawing Sheet

F I G. 1
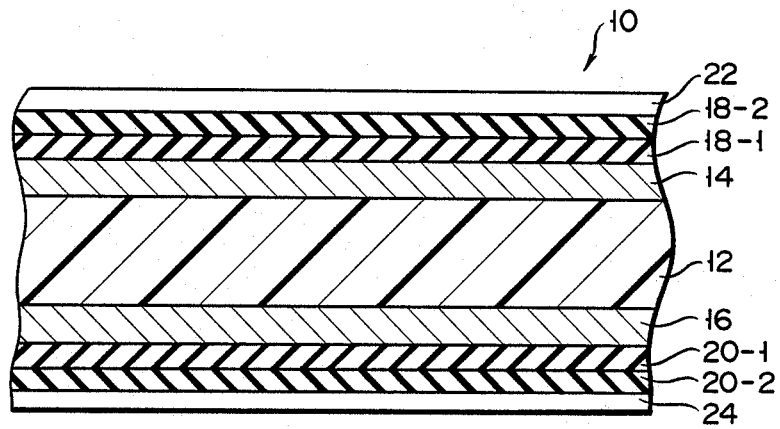
F I G. 2
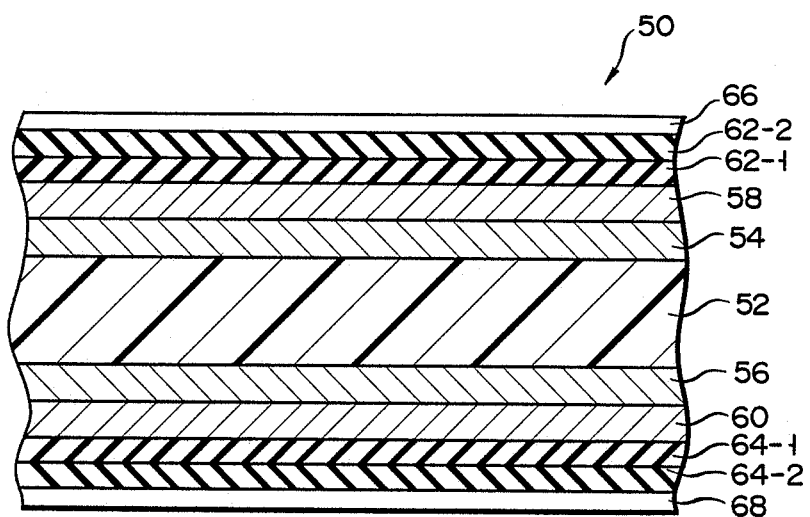

PERPENDICULAR MAGNETIC RECORDING MEDIUM WITH MULTILAYERED PROTECTIVE LAYER

BACKGROUND OF THE INVENTION

The present invention relates to magnetic recording media and in particular, to a magnetic recording medium having a metal thin film formed on a base layer as a perpendicular magnetic recording layer.

Recently, considerable effort has been given to the development of perpendicular magnetic recording media. Such recording media offer an advantage over conventional magnetic tapes or disks in that they can store data information at a high recording density to provide very large storage capabilities.

A disk-shaped magnetic recording disk of the type known as a floppy disk or diskette can include a ferromagnetic metal thin film which is formed, by a sputtering or vapor deposition method, on a flexible base layer to serve as a perpendicular recording layer. The recording layer may be a thin film of cobalt-chromium based alloy, or a thin film of oxide having a magnetoplumbite crystal structure, such as ferrite barium, ferrite strontium, etc. These kinds of ferromagnetic substances are too hard to obtain the elasticity enough to keep a smoothness in mechanical touch between the magnetic head and the recording layer. Accordingly, not only the recording layer but also the magnetic head, itself, will be damaged at its tracing portion which is in continuous and direct contact with the recording layer of rotating disk in the data read/write mode.

On each recording layer is thus provided a protective layer which is usually comprised of a nonmagnetic insulative layer of a suitable mechanical strength. Silicon oxide, aluminum oxide, or titanium nitride has been considered as a common substance for the protective layer. Use of silicon oxide has been proposed in Japanese Patent Disclosure (KOKAI) No. 60-61920, for example. Use of aluminum oxide protective layer has been disclosed in Japanese Patent Disclosure (KOKAI) No. 58-91530. Any of these substances, however, cannot serve, by itself, as a complete protective layer for the perpendicular magnetic recording disk for the following reasons.

It is strictly required for the protective layer of the perpendicular magnetic disk that the thickness thereof is set to a specific value, which is suitable to make data read/write operation of the magnetic disk most effective. The thickness of the protective layer defines a requisite distance between the recording layer and the track-tracing portion of the magnetic head. Since the recording density of the perpendicular magnetic disk is very high compared with the conventional disk, when a data signal recorded is reproduced whose frequency is high and thus which could not be stored in the conventional magnetic disk, the requisite distance between the recording layer and the magnetic head must be precisely controlled not to be larger than that specific distance.

In this case it is very difficult to properly increase the hardness of the protective layer without also increasing its thickness. If the protective layers are too hard as compared to the magnetic head, the magnetic head will be worn due to continuous contact with the protective layer. Therefore, a protective layer made of aluminum oxide is not considered suitable for a perpendicular magnetic recording medium. For this reason, according to a perpendicular magnetic recording medium disclosed in Japanese Patent Disclosure (KOKAI) No. 58-91530, a liquid lubricant must be impregnated in an aluminum oxide protective layer to improve the head traceability.

If, on the other hand, the protective layer is too soft, it will be easily abraded due to continuous tracing of the magnetic head. It follows that the recording layer can no longer be protected from wear in the data recording or reproduction mode. A protective layer made of silicon oxide or titanium nitride can for no longer period remain as a good protective layer for a perpendicular magnetic recording medium.

SUMMARY OF THE INVENTION

It is accordingly an object of the present invention to provide a new and improved perpendicular magnetic recording medium with a protective layer structure which can improve both the durability and head traceability of the recording layer without degrading its high recording density.

In accordance with the above object, the present invention is directed to a specific recording medium which includes a base layer, a perpendicular magnetic recording layer formed on the base layer and having an axis of easy magnetization in a direction perpendicular to its surface. The magnetic recording layer stores data information in a track which is defined by a magnetic head on said recording layer.

A double-layered or -stacked protective layer structure is formed on the recording layers. The protective layer structure comprises a first thin-film layer formed directly on the recording layer and a second thin-film layer stacked on the first thin-film layer. The second layer has a hardness less than that of a magnetic recording head, while the first layer has a hardness greater than that of the second thin-film layer. The total thickness of the first and second thin-film layers defines a minimal distance between the recording layer and the magnetic head which traces a data storing track on the recording layer. Preferably, one thin-film layer is formed of an Si-N-O-based layer and employed as the first protective layer and the other thin-film layer is formed of silicon oxide and employed as the second protective layer.

The present invention, as well as the other objects and advantages thereof, will become more apparent with reference to the preferred embodiments as set forth below.

BRIEF DESCRIPTION OF THE DRAWINGS

In the detailed description of a preferred embodiment of the invention presented below, reference is made to the accompanying drawings in which:

FIG. 1 shows a sectional view, not to scale, of a perpendicular magnetic recording disk having a double-layered protective layer structure on each side surface thereof in accordance with one preferred embodiment of the invention; and FIG. 2 is a sectional view, not to scale, of a perpendicular magnetic recording disk having a double-layered protective layer structure in accordance with another embodiment of the invention.

DETAILED DESCRIPTION OF THE PREFERRED EMBODIMENTS

There is shown in FIG. 1 of the drawings a disk-shaped perpendicular magnetic recording medium known as a floppy disk, which is designated generally by reference numeral 10. Floppy disk 10 has disk-shaped flexible base layer 12, which is also known as a support among skilled persons. Base layer 12 may be a nonmagnetic substrate comprised of polymeric plastic material. Two magnetic recording layers 14 and 16 are formed one on each surface of base layer 12 and comprise ferro-magnetic material, such as cobalt-chromium (Co-Cr) based alloy. These recording layers 14 and 16 are formed by a DC magnetron sputtering technique or any other known methods to have a thickness of 0.05 to 1.0 micrometer each. Recording layers 14 and 16 have an axis of easy magnetization substantially perpendicular to the film surfaces thereof, thereby allowing the recording/reproduction operation (or writing/reading operation) of data in accordance with the perpendicular magnetic recording technique.

Protective layer structure 18 and 20 are formed on recording layers 14 and 16, respectively. Each protective layer structure 18 (or 20) includes two protective layers 18-1 and 18-2 (20-1 and 20-2) which are disposed one above another on the corresponding recording layer. First protective layer 18-1 may be a thin film of silicon-nitride-oxide system (referred to as "Si-N-O film" hereinafter) formed directly on the recording layer 14. Second protective layer 18-2 may be a thin film of silicon oxide ($SiO_2$), which is formed on first protective layer 18-1.

According to this embodiment, lubricious thin films 22 and 24 are further provided as lubricant layers on the second protective layers 18-2 and 20-2 respectively. In this magnetic disk 10 fluorocarbon film layers are particularly employed as lubricious thin films 22 and 24. When a magnetic head (not shown) is in contact with one side surface of the recording medium, the requisite distance between the recording layer and the tracktracing portion of the magnetic head is defined as a total thickness of three layers, that is, first and second protective layers 18-1 and 18-2 (or 20-1 and 20-2) and lubricant layer 22 (or 24). It should be noted that the fluorocarbon lubricant layer, itself, has been shown in FIG. 3 and the related description appears in U.S. Pat. application Ser. No. 750,270, which was filed in July 1, 1985.

Perpendicular magnetic recording disks of this invention were manufactured each having a double-layered or -stacked protective layer structure (18, 20) as shown in Table below and measured for their durability. In these Samples, protective layer structures 18 and 20 are formed, respectively, on recording layers 14 and 16, made of Co-Cr based alloy, by virtue of a sputtering method using a high frequency wave. In Table below are shown the respective Samples, three Samples (Nos. 6 to 8—controls) of which has a single layer made of silicon oxide ($SiO_2$), aluminum oxide ($Al_2O_3$) or silicon carbide (SiC).

TABLE

| | First Protective Layer | | Second Protective Layer | | Durability |
|---|---|---|---|---|---|
| | Material | Thickness | Material | Thickness | (Number of Passes) |
| Sample No. 1 | Si—N—O | 6 nm | $SiO_2$ | 3 nm | $80 \times 10^5$ |
| Sample No. 2 | Si—N—O | 15 nm | $SiO_2$ | 5 nm | $130 \times 10^5$ |
| Sample No. 3 | Si—N—O | 10 nm | $SiO_2$ | 10 nm | $130 \times 10^5$ |
| Sample No. 4 | Si—N—O | 10 nm | $SiO_2$ | 5 nm | $110 \times 10^5$ |
| Sample No. 5 | Si—N—O | 15 nm | $SiO_2$ | 10 nm | $140 \times 10^5$ |
| Sample No. 6 | $SiO_2$ | 20 nm | — | — | $25 \times 10^5$ |
| Sample No. 7 | $Al_2O_3$ | 20 nm | — | — | $25 \times 10^5$ |
| Sample No. 8 | SiC | 20 nm | — | — | $2 \times 10^5$ |

The respective Samples were tested for their durability, the conditions of which were as follows:

The respective perpendicular magnetic recording media were manufactured in the form of an ordinary floppy disk. The disk was rotated at a rate of 300 turns per minute and continuously traced by a ferrite magnetic head. A durability limit up to which data was able to be recorded and reproduced in a better condition was judged by the number of turns effective until one of the recording layer and magnetic head was heavily damaged. By the "heavy damage" was defined a state in which the protective layer was exfoliated from the recording medium due to its contact with the head to partly expose the underlying recording layer. According to the present invention, therefore, the magnetic disk was judged as having been heavily damaged at the time when at least one of first and second protective layers 18-1 and 18-2 (or 20-1 and 20-2) of the protective layer structure was exfoliated.

The following fact has been found from the above Table. Upon comparison with a conventional magnetic disk having a single protective layer, the magnetic disk of the invention having the first protective Si-N-O layer and second protective $SiO_2$ layer on each recording layer reveals a high excellence in durability even under the condition that the total thickness of the first and second protective layers is set to be very thin, of the order of 40 nm. This means that this outstanding feature can also contribute much to preventing the wear and damage of the magnetic head. According to Sample No. 5 of the invention the total thickness of the first and second protective layer was 25 nm and the durability of the protective layer was measured as having achieved 14 million number of turns. This figure is more than five times as great as that of Sample No. 6 or 7 (Control) having a conventional protective layer structure, noting that this latter Sample manifested the most durable state among the conventional Samples. This is probably because the second protective $SiO_2$ layer of a relatively low hardness is difficult to scratch even in contact with the head; because the first protective Si-N-O-based layer of a relatively high hardness makes an intimate bond to the second protective layer whereby it prevents any scratch from being developed and expanded, and because both the first and second protective layers show an excellent wettability to a lubricant, in particular, a fluorocarbon based liquid lubricant.

For the first protective layer consisting of 45 to 55% silicon, 10 to 50% nitrogen and 5 to 45% oxygen, all being an atomic percent, the durability effect is much more improved on the order of more than 13 million passes. In this connection it is to be noted that Sample Nos. 1 to 5 (embodiments of the present invention) employed the first protective layer consisting of 33% oxygen, 33% nitrogen and a reminder of silicon, all being an atomic percent. Needless to say, the aforementioned first protective layer may also contain a somewhat small amount of impurity.

According to the present invention the total thickness of the first and second layers is preferably within a range of 5 to 40 nm. For that figure less than 5 nm, the first protective layer fails to serve fully as the protective layer and for said figure exceeding 40 nm the spacing loss becomes practically too great to be disregarded. The ratio of the thickness of the second protective layer to the total thickness of the first and second protective layers is properly within a range of 5 to 70%. For that figure less than 5% no "scratch initiation" is fully prevented and for said figure exceeding 70% no full durability can be expected from the first protective layer.

The perpendicular magnetic recording medium according to one embodiment of the present invention has the following advantages.

First it is possible to prevent "scratch initiation" on the magnetic recording medium. The protective layer structures (each of which comprises a double-stacked layer structure) are formed on the corresponding recording layers, respectively, which are formed, one on each surface of base layer 12. Upon the data read/write operation, upper protective layer 18-2 (or 20-2), in direct contact with the magnet head, is formed of a relatively soft layer (or a material of lower hardness), such as $SiO_2$, while on the other hand the lower protective layer 18-1 (or 20-1) is formed of a relatively hard layer (or a material of higher hardness), such as an Si-N-O-based layer. Since the upper portion of the protective layer is softer in nature it is possible positively to prevent a so-called "scratch initiation", a phenomenon wherein a scratch occurs on the surface of the head or on the recording medium during the initial use of the recording medium. This can contribute much to improving the durability of the recording medium. Furthermore, even if a scratch occurs on the upper surface portion of the protective layer due to long-duration contact with the head during recording or reproduction, it cannot be continue into the lower portion of the protective layer (directly overlying the recording layer), since the lower portion of the protective layer is harder in nature.

Second, the total thickness of the first and second protective layers, of which the double-layered protective layer structure is comprised, can be made even thinner by using varying materials for the first and second protective layers. This means that according to the present invention in order to effectively perform a perpendicular magnetic recording at a high density level, the requirement that the distance between the forward end of the magnetic head and the top surface of the recording layer be minimized is completely met. The minimization of the requisite distance between the turning disk and the magnetic head improves the frequency characteristic of the magnetic disk, and at the same time it prevents a drop in the level of an output signal at the time of data reproduction. The perpendicular magnetic recording medium of the invention provides an excellent mechanical durability as well as an excellent magnetic characteristic for the operation of high density recording.

Third, the double-stacked protective layer structure can eliminate pin-holes which would otherwise be produced therein during the manufacture of a conventional protecting layer structure. Therefore, it is possible to externally shield both magnetic recording layers (formed one at each surface of the base layer). It is thus possible to effectively prevent the recording layer from being attacked by oxidation.

Fourth, the double-stacked protective layer structure permits an effective excellent lubricant layer 22 (or 24) to be readily formed thereon. A fluorocarbon based liquid lubricant exhibits, in particular, a better wettability to the upper protective layer 18-2 (20-2) when made of silicon oxide. The use of this lubricant can provide an ideal, thin, and uniform, lubricant layer on the upper protective layer 18-2 (20-2). As a result, the magnetic disk enables better contact with the head, better head trackability, and better wear resistance. This lubricant also discloses a better wettability to the Si-N-O-based lower protective layer 18-1 (or 20-2). When a scratch close occurs on the upper protective layer, lubricant is already intimately attached to the lower protective layer whereby the underlying recording layer too can be protected.

A second embodiment of this invention will now be described with reference to FIG. 2, which illustrates a cross section of a perpendicular magnetic recording disk 50 having a double-layered or -stacked magnetic layer structure on each side of a base layer.

On both sides of the base layer 52 is provided magnetic thin-film layers 54 and 56 which comprise soft magnetic material, such as permalloy. These soft magnetic thin-film layers 54 and 56 serve as sub-base layers and may be formed by using a known vapor deposition method. Recording layers 58 and 60 are disposed on soft magnetic thin-film layers 54 and 56, respectively. Magnetic recording layers 58 and 60 comprise a ferromagnetic material, such as a cobalt-chromium (Co-Cr) alloy. These perpendicular magnetic recording layers 58 and 60 may be formed using a known DC magnetron sputtering technique.

Protective layer structures 62 and 64 are formed on recording layers 58 and 60, respectively. Each protective layer structure 18 (or 20) includes two protective layer 62-1 and 62-2 (64-1 and 64-2) which are formed one above another on each side of base layer 53 in the same manner as in the first embodiment described with reference to FIG. 1. First protective layer 62-1 (or 64-1) is a thin film of silicon-nitride-oxide (referred to as "Si-N-O film" hereinafter), while second protective layer 62-2 (or 64-2) is a thin film of silicon oxide ($SiO_2$).

Lubricious thin films 66 and 68 are provided as lubricant layers on second protective layers 62-2 and 64-2. Also in this magnetic disk 50 fluorocarbon film layers are particularly employed as lubricant thin films 66 and 68 for the same reason as that of the first embodiment shown in FIG. 1.

The concept of the double-layered protective layer structure can also be applied to the aforementioned perpendicular magnetic recording layer having the soft magnetic sub-base layers, thereby obtaining the same advantage as set forth above. Soft magnetic layers 54 and 56 are formed beneath the recording layers, respectively, to improve the magnetic permeability in the recording layer under a perpendicular magnetic field applied by the magnetic head. Layers 54 and 56 may be formed of, for example, a Co-Zr based alloy or Sendust alloy.

Although the invention has been described with reference to specific embodiments, it will be understood by those skilled in the art that numerous modifications may be made that are within the spirit and scope of the inventive contribution.

Although in the embodiment, for example, the Co-Cr based alloy layer has been exemplified as the recording magnetic layer, any other proper material may be made so long as it has a perpendicular magnetic anisotropy. As such material use may be made of not only a metallic layer but also a thin oxide layer. Although in the embodiment the recording magnetic layer and protective layer have been explained as being formed on each side of the base layer, this invention can also be applied to the case where these layers are formed on a single surface of the base layer.

What is claimed is:

1. A perpendicular magnetic recording medium comprising:
   (a) a substrate;
   (b) a recording layer comprising a ferro-magnetic metallic layer which is formed on said substrate end has an axis of easy magnetization in a direction perpendicular to its surface, said recording layer storing in a track definad thereon a data signal magnetically recorded by a magnetic head; and
   (c) a multilayered protective layer structure which is provided on said recording layer to protect both said recording layer and the magnetic head from wear, said protective layer structure comprising,
   a first non-magnetic protective layer comprising a silicon-nitride-oxide thin-film layer formed directly on said recording layer and having a first hardness, and
   a second non-magnetic protective layer comprising a silicon exide thin-film layer stacked on said first protective layer and having a second hardness which is less than that of the magnetic head so as to prevent wear of the magnetic head, said first hardness being greater than said second hardness so as to protect said recording layer from wear, said first and second protective layers having their total thickness ranging from 5 to 40 nanometers, which is small enough to maximize an efficiency in perpendicular magnetic recording of the data signal wherein said second protective layer has a thickness which is in the range of 5 to 70 percent of the total thickness of said first and second protective layers.

2. The recording medium according to claim 1, wherein said recording layer comprises a thin-film layer of cobalt-chromium based alloy.

3. The recording medium according to claim 2, further comprising:
   a fluorocarbon layer formed on said second thin-film layer for serving as a lubricant layer.

4. The recording medium according to claim 3, further comprising:
   a soft magnetic thin-film layer formed between said substrate and said recording layer.

5. The recording medium according to claim 3, wherein said first protective layer contains from 45 to 55% by weight of silicon.

6. The recording medium according to claim 3, wherein said first protective layer contains from 45 to 55% by weight of silicon and from 10 to 45% by weight of nitrogen.

7. The recording medium according to claim 3, wherein said first protective layer contains from 45 to 55% by weight of silicon, from 10 to 45% by weight of nitrogen, and from 5 to 45% by weight of oxygen.

8. The recording medium according to claim 7, wherein said second protective layer has its thickness which is substantially half the total thickness of said first and second protective layers.

* * * * *